United States Patent [19]

Havins

[11] Patent Number: 4,928,915

[45] Date of Patent: May 29, 1990

[54] MOUNTING APPARATUS FOR SONAR TRANSDUCER

[76] Inventor: Felton H. Havins, 300 N. E. 6th St., Fort Worth, Tex. 76106

[21] Appl. No.: 314,903

[22] Filed: Feb. 24, 1989

[51] Int. Cl.$^5$ .......................... E04G 3/00; H04R 1/44
[52] U.S. Cl. ................. 248/288.5; 248/295.1; 367/173
[58] Field of Search ............... 248/288.5, 288.3, 291, 248/295.1, 205.1, DIG. 4; 114/364; 440/6; 367/173, 141

[56] References Cited

U.S. PATENT DOCUMENTS

| | | | |
|---|---|---|---|
| 1,285,218 | 11/1918 | Kershaw | 248/288.5 X |
| 1,303,345 | 5/1919 | McFeaters | 248/288.5 X |
| 3,039,078 | 6/1962 | Wilcoxon | 367/173 X |
| 4,282,590 | 8/1981 | Wingate | 367/173 X |
| 4,285,485 | 8/1981 | Burke | 367/173 X |
| 4,485,462 | 11/1984 | Wiegner | 367/173 X |

FOREIGN PATENT DOCUMENTS 180506  8/1956  Sweden ........................ 367/173

Primary Examiner—Reinaldo P. Machado
Attorney, Agent, or Firm—Geoffrey A. Mantooth; James C. Fails

[57] ABSTRACT

An apparatus mounts a sonar transducer to a boat. The apparatus includes a tubular member with a handle at one end and a transducer mounting bracket at the other end. The transducer mounting bracket is adapted to couple to a sonar transducer. Both the handle and the transducer mounting bracket are pivotally coupled to the tubular member and to each other by a linkage rod. By moving the handle up or down, the transducer mounting bracket will move correspondingly to a new elevational orientation. The tubular member is received by a cylindrical bore in a ball; the ball is mounted to the boat. By turning the handle to one side, the tubular member and the transducer mounting bracket will correspondingly turn to a new azimuthal orientation.

23 Claims, 3 Drawing Sheets

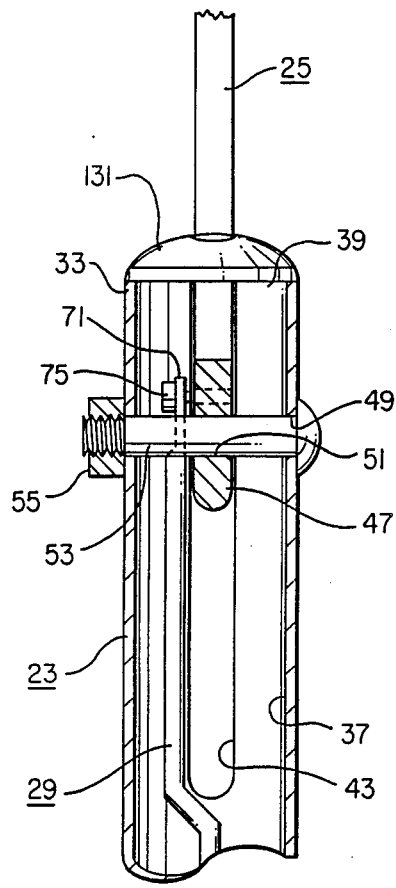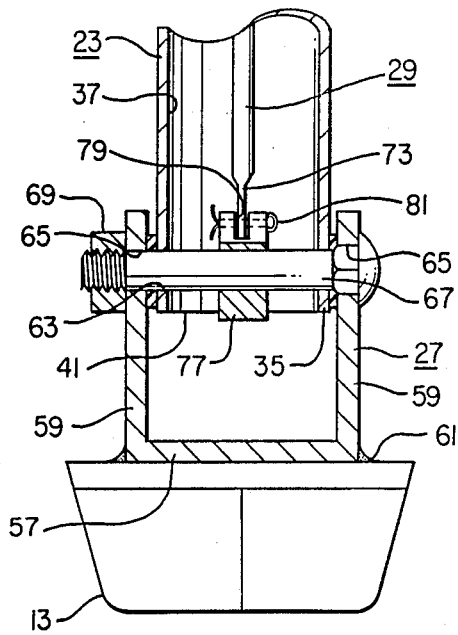
FIG. 4
FIG. 5

MOUNTING APPARATUS FOR SONAR TRANSDUCER

FIELD OF THE INVENTION

The present invention relates to apparatuses for mounting sonar transducers to boats.

BACKGROUND OF THE INVENTION

Fishermen and pleasure boaters use sonar instrumentation for fish finding and for determining the depth of the water. The sonar instrumentation uses a sonar transducer that emits sound waves in a conical beam, thus giving the transducer directional capabilities.

In the prior art, transducers are mounted to a boat by attachment to the bottom of the hull, to the transom, or to a trolling motor, or by mounting the transducer in the hull. The orientation of most transducers is fixed in the downward direction so that the sonar transducer scans the water directly beneath the boat.

There are many instances however, when it is desirable to scan the water laterally around the boat. For example, in fish finding applications, it is frequently easier to locate fish with side-scanning sonar than with down-scanning sonar. In depth finding applications, if the boat is near a cliff, it is frequently desirable to have side-scanning sonar capabilities to examine the underwater extent of the cliff. With prior art mounted sonar transducers, such side-scanning is impossible. What is needed then is an apparatus for mounting a sonar transducer to a boat, which apparatus will allow the transducer to scan laterally of the boat.

SUMMARY OF THE INVENTION

It is an object of the present invention to provide an apparatus for mounting a sonar transducer to a boat, which apparatus allows sonar scanning of the water laterally around the boat.

It is another object of the present invention to provide a sonar transducer mounting apparatus that provides for changes in the elevational and azimuthal orientations of the transducer.

The mounting apparatus of the present includes a first member, handle means, transducer mounting means, a second member, and first member mounting means. The first member has first and second end portions. The handle means is pivotally coupled to the first member first end portion, while the transducer mounting means is pivotally coupled to the first member second end portion such that the transducer mounting means can change elevational orientation with respect to a water line of the boat. The transducer mounting means is adapted for coupling to a sonar transducer. The second member is located adjacent to the first member and is coupled to the handle means and to the transducer means so as to link the transducer mounting means to the handle means. When the handle means pivots, the transducer mounting means correspondingly changes its elevational orientation. The first member mounting means mounts the first member to the boat such that the first member second end portion is submerged when the boat is in the water and the first member first end portion is above the water. The first member mounting means allows the handle means, the first member, and the transducer mounting means to vary their azimuthal orientation.

In one aspect, the first member is a tubular member with the second member located inside of the first member. In another aspect, the second member is a rod. In still another aspect, the first member mounting means includes a ball for receiving the first member. The ball and the first member can pivot. In still another aspect, the first member can move relative to the ball to adjust the submerged depth of the first member second end.

The mounting apparatus of the present invention allows the remote operation of the submerged transducer. The operator can manipulate the orientation of the transducer from a comfortable position above the water. By moving the handle means up or down, the elevational orientation of the transducer is varied accordingly. By turning the handle means from side to side, the azimuthal orientation of the transducer is varied accordingly. Thus, sonar scanning is not limited to areas beneath the boat, but rather encompasses areas all around the boat, including areas near the surface of the water.

BRIEF DESCRIPTION OF THE DRAWINGS

FIG. 4 is a longitudinal cross-sectional view of the mounting apparatus, taken through lines IV—IV of FIG. 3, showing how the handle is pivotally mounted.

FIG. 5 is a longitudinal cross-sectional view of the mounting apparatus, taken through lines V—V of FIG. 3, showing how the transducer mounting bracket is pivotally mounted.

DESCRIPTION OF PREFERRED EMBODIMENT

Figure 1:
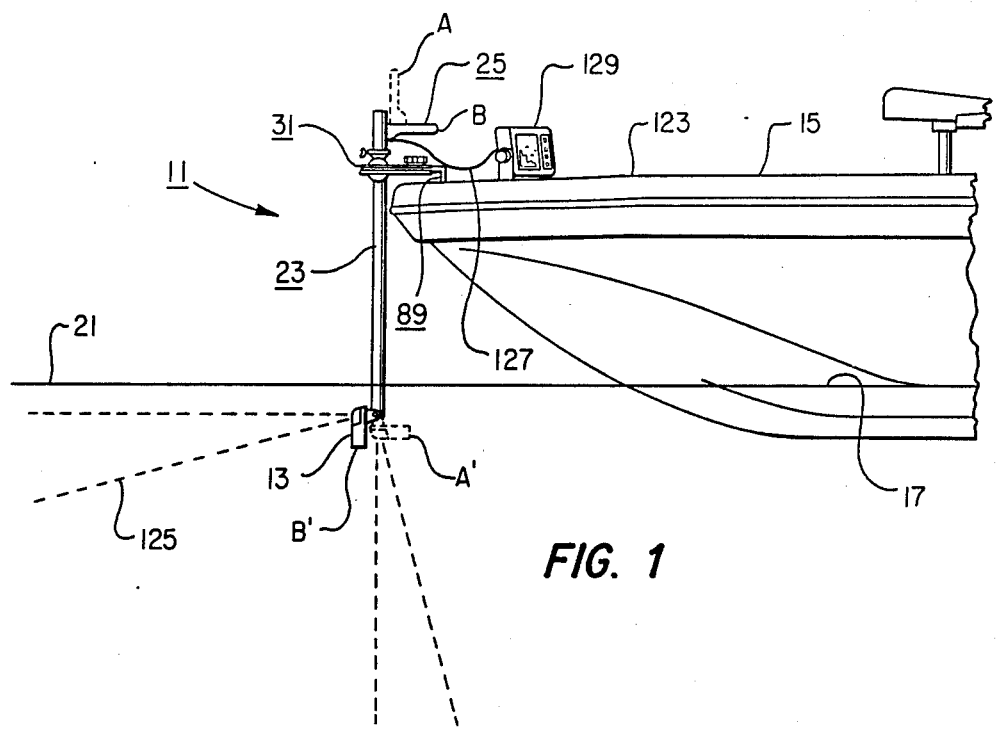
FIG. 1 is a side view of the bow portion of a boat, showing the mounting apparatus of the present invention, in accordance with a preferred embodiment.

In FIG. 1, there is shown a side view of the mounting apparatus 11 of the present invention, in accordance with a preferred embodiment. The mounting apparatus 11 of the present invention is used to mount a sonar transducer 13 to a boat 15 and allows the sonar transducer to change its elevational orientation relative to the water line 17 of the boat (or surface of the water 21) and its azimuthal orientation relative to the center line 19 of the boat (see FIG. 2). By changing the elevational orientation of the sonar transducer 13, areas ranging from directly under the boat to areas near the surface 21 of the water can be scanned with sonar. By changing the azimuthal orientation of the sonar transducer, a 360 degree sonar scan around the boat can be accomplished without having to turn the boat 15.

Figure 3:
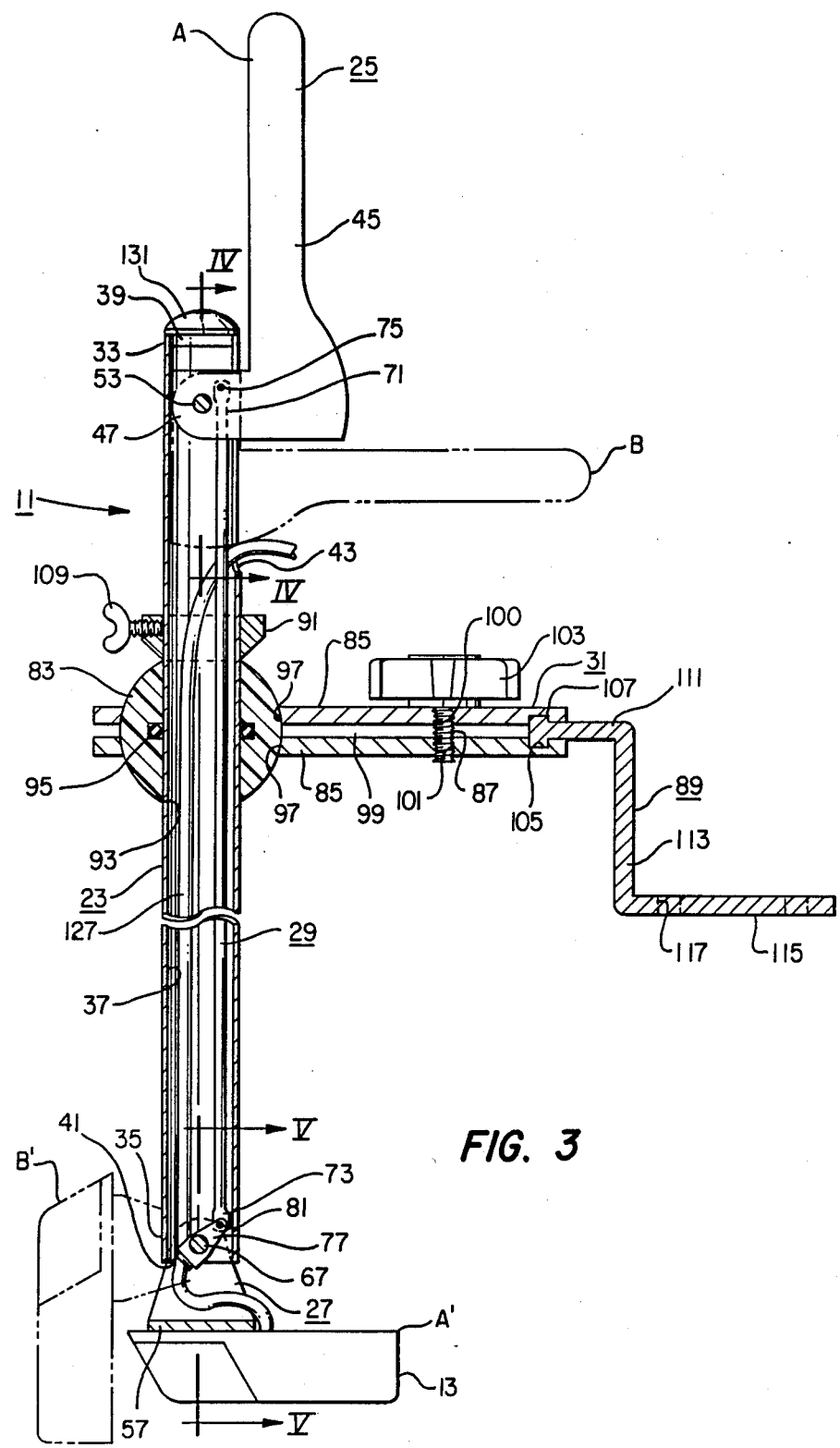
FIG. 3 is a longitudinal cross-sectional side view of the mounting apparatus, taken through lines III—III of FIG. 2.

Referring to FIG. 3, the mounting apparatus 11 of the present invention includes a tubular member 23, a handle 25, a transducer mounting bracket 27, a linkage rod 29, and a mounting assembly 31.

The tubular member 23 is a tube having first and second ends 33, 35. The tubular member 23 has an interior cavity 37 with openings 39, 41 at the first and second ends 33, 35 that allow communication between the exterior of the tubular member and the interior cavity. The first end 33 of the tubular member has a longitudinal slot 43 that extends for a short distance towards the second end.

Referring to FIGS. 3 and 4, the slot 43 receives a portion of the handle 25. The handle 25 is a flat plate that has two integral segments, a long segment 45 and a short segment 47, that are perpendicular to each other. The short segment 47 is received by the slot 43 and the interior cavity 37 of the tubular member 23 where the handle is pivotally coupled to the tubular member 23 near the first end 33. The short segment 47 of the handle 25 and the tubular member first end have respective circular openings 49, 51 for receiving a bolt 53. The bolt 53, which is oriented perpendicularly to the handle 25, extends through one of the tubular member openings 49, into the interior cavity 37, through the handle opening 51, into the interior cavity again, and through the other the tubular member openings 49. A nut 55 retains the bolt 53 in place. The tubular member slot 43 maintains the handle short segment 47 in the center of the interior cavity. The handle is pivotable between first and second orientations A, B. In the first orientation A, the long segment 45 of the handle is parallel to the longitudinal axis of the tubular member 23, which axis extends between the first and second ends 33, 35. In the second orientation B, the long segment 45 is perpendicular to the longitudinal axis of the tubular member.

The transducer mounting bracket 27 is located at the second end 35 of the tubular member 23. Referring to FIGS. 3 and 5, the transducer mounting bracket 27 has a rectangular bottom plate 57 and two side plates 59 that extend perpendicularly from opposite sides of the bottom plate. The bottom plate 57 is coupled to the back of the sonar transducer 13. In the preferred embodiment, adhesive 61 is used to couple the transducer to the bottom plate, however, alternative configurations of some sonar transducers may allow the bolting of the transducer mounting bracket to the transducer. The distance between the side plates 59 is slightly greater than the diameter of the tubular member 23 so that the tubular member second end 35 is received by the space between the side plates. The tubular member second end 35 and the side plates 59 have respective circular openings 63, 65 for receiving a bolt 67. The bolt 67, which is parallel to the handle bolt 53, extends through the opening 65 in one of the side plates 59, through one of the tubular member openings 63, into the interior cavity 37, through the other of the tubular member openings, and through the opening in the other side plate. A nut 69 retains the bolt 67 in place. The transducer mounting bracket 27 can pivot between first and second orientations A', B'. In the first orientation A', the bottom plate 57 is perpendicular to the tubular member longitudinal axis, wherein the sonar transducer 13 is oriented perpendicular to the tubular member longitudinal axis. In the second orientation B', the bottom plate 57 is parallel to the tubular member longitudinal axis, wherein the sonar transducer 13 is oriented parallel to the tubular member longitudinal axis.

The linkage rod 29 has first and second ends 71, 73 and is made out of a stiff material such as steel (see FIGS. 3-5). The linkage rod 29 is located in the tubular member interior cavity 37 with the first end 71 pivotally coupled to the handle 25 and the second end 73 pivotally coupled to the transducer mounting bracket bolt 67. The first end 71 is located adjacent to the short segment 47 of the handle 25 where a pin 75 extends through the rod first end 71 and through the handle to pivotally couple the rod to the handle. The pin 75 extends through the handle at a point that is between the longitudinal axis of the tubular member and the slot 43, and along a first imaginary line extending through the center of the bolt 53 at about a 45 degree angle from the tubular member longitudinal axis. With the pin 75 so positioned, as the handle 25 is moved from the first orientation A to the second orientation B, the linkage rod 29 is pushed towards the tubular member second end 35. The linkage rod 29 is bent slightly at the first end portion to avoid interference with any motions of the handle (see FIG. 4). The second end 73 of the linkage rod 29 is pivotally coupled to a linkage member 77 that extends radially from the transducer mounting bracket bolt 67. The linkage member 77 is fixedly coupled to the shank of the bolt 67. At the free end of the linkage member is a notch 79 for receiving the second end 73 of the linkage rod 29. A pin 81 pivotally secures the linkage rod 29 to the linkage member 77. The pin 81 is located along a second imaginary line that extends through the center of the bolt 67 and that is parallel to the first imaginary line through the handle bolt 53.

With the linkage rod connected as described above, the first orientation A of the handle 25 corresponds to the first orientation A' of the transducer mounting bracket 27 and of the transducer 13. Likewise, the second orientation B of the handle 25 corresponds to the second orientation B' of the transducer mounting bracket 27 and of the transducer 13.

The mounting assembly 31 includes a ball 83, two plates 85, a setting screw 87, a bracket 89, and a collar 91 (see FIG. 3). The ball 83 has a cylindrical bore 93 through its center. The cylindrical bore 93 is sized to matingly receive the tubular member 23 such that the ball is located between the tubular member first and second ends. The cylindrical bore 93 has a circumferential groove for receiving an O-ring 95. The O-ring 95 extends circumferentially around the tubular member 23 when the tubular member is installed in the ball 83. Each plate has a circular opening 97 formed therethrough. The diameter of each circular opening 97 is slightly less than the diameter of the ball 83. The plates 85 are fitted onto the ball 83 such that each plate opening 97 receives a respective hemisphere of the ball 83. The plates 85 are oriented parallel to each other, with a gap 99 therebetween. The upper plate has a bore 100 and the lower plate has a threaded bore 101, which bores are aligned with each other. The bores 100, 101 receive the setting screw 87, which has a knob 103 for ease of turning. The ball 83, and the tubular member 23, are retained by the plates 85. The setting screw 87 is used to adjust the compressive forces exerted by the plates 85 on the ball 83. When the setting screw 87 is tightened to cause the plates 85 to exert compressive forces on the ball 83, the ball 83 is unable to rotate relative to the plates 85. When the setting screw 87 is loosened to relieve the compressive forces caused by the plates on the ball, the ball, and thus the tubular member, can pivot relative to the plates. The plates also have respective rectangular grooves 105 that receive a bar 107 on the bracket 89. The collar 91 is located around the tubular member 23 above the ball 83. The collar 91 has a set screw 109 for fixing the position of the collar along the tubular member.

The bracket 89 has first, second, and third integral plates 111, 113, 115. The first and third plates 111, 115 are parallel to each other and are perpendicular to the second plate 113. The first and third plates 111, 115 are coupled to opposite sides of the second plate 113 and extend in opposite directions from each other. The third plate 115 has holes 117 for receiving bolts 119 (see FIG. 2) that bolt the bracket 89 to a boat deck 121. The length of the second plate 113, which is the distance between the first and third plates 111, 115, is as long as necessary to extend the first plate over the boat gunwale 123. The bar 107 is at the free end of the first plate 111. The bar 107 extends slightly above and below the first plate 111 so as to form lips.

Figure 2:
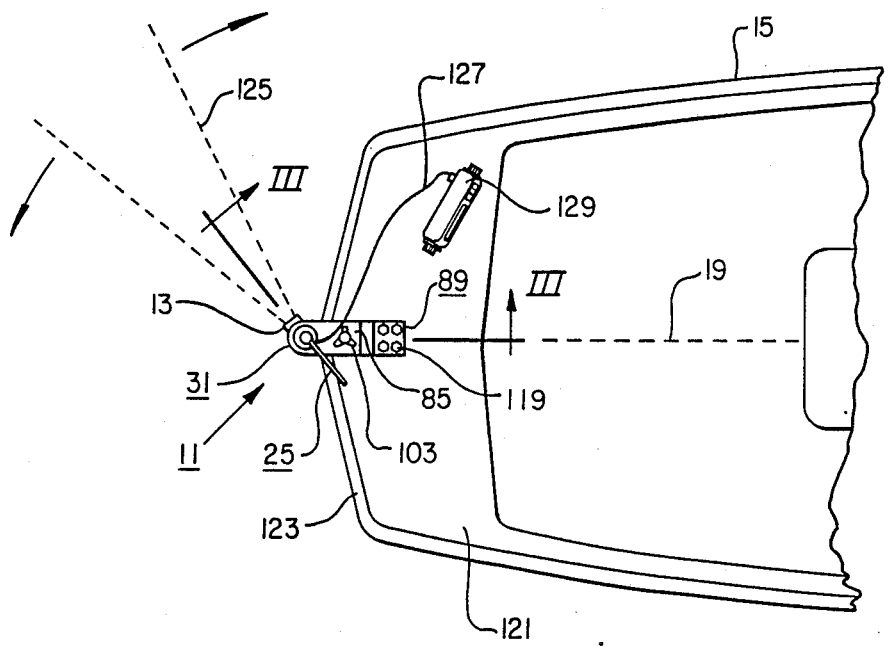
FIG. 2 is a plan view of the boat bow portion of FIG. 1.

The mounting apparatus 11 is set up by mounting the bracket 89 to the boat deck 121. The third plate 115 is laid flat on the boat deck so that the first plate 111 extends out over the gunwale 123. In FIGS. 1 and 2, the mounting bracket 89 is shown mounted on a raised deck 121 at the bow of the boat 15. The mounting apparatus 11 can, however, be mounted anywhere on the boat, as for example on a gunwale. The tubular member 23 is vertically oriented, with the sonar transducer 13 submerged, and the handle located at a higher position than the boat gunwale 123 for easy access by the operator.

The sonar transducer 13 is conventional and produces a conically shaped sonar beam 125 that widens as the distance from the transducer increases. The conical beam 125 gives the transducer a directional capability. The transducer 13 has a cord 127 for electrical connection to a conventional display unit 129. The display unit 129 is positioned at some convenient location on the boat. The cord 127 is routed from the sonar transducer 13, through the interior cavity 37, and out through the slot 43.

The operation of the mounting apparatus 11 of present invention will now be described. The orientation of the sonar transducer 13 can be changed to scan areas of water directly beneath the boat and areas that are near the surface 21 of the water. A particular area can be scanned by adjusting the elevational and azimuthal orientations of the transducer 13 accordingly. The elevational orientation is referenced with respect to the water line 17 of the boat (which is the same as the surface 21 of the water when the boat is in the water). Referring to FIGS. 1 and 3, with the handle 25 and the transducer mounting bracket 27 in their respective first orientations A, A', the transducer 13 is pointed directly down to produce a sonar beam that is generally perpendicular to the boat water line 17. To change elevational orientation of the transducer, the operator grips the long segment 45 of the handle 25 to move the handle down towards the second orientation B, wherein the linkage rod 29 is pushed down, causing the linkage member 77, the bolt 67, the transducer mounting bracket 27, and the transducer 13 to pivot upwardly to the new orientation B'. With the handle 25 and the transducer mounting bracket 27 in their respective second orientations B, B', the sonar beam is generally parallel to the boat water line 17 and allows scanning of areas just below the surface 21 of the water. Intermediate elevational orientations between the first and second orientations of the transducer can be achieved by positioning the handle between its first and second orientations. The angle of the long segment 45 of the handle 25 relative to the boat water line 17 is the same as the elevational orientation of the sonar transducer 13, thus providing a visual indication of the transducer orientation to the boat operator.

The azimuthal orientation is referenced with respect to the center line 19 of the boat. Referring to FIG. 2, the azimuthal orientation of the transducer 13 can be changed by moving the handle 25 to one side, thereby causing the tubular member 23 to turn about its longitudinal axis. The tubular member 23 turns within the cylindrical bore 93 of the ball 83. The handle 25 is moved in the opposite direction to the desired transducer movement. The angle of the handle 25 relative to the boat center line 19 is the same as the azimuthal orientation of the sonar transducer, thus providing a visual indication of the transducer orientation.

By combining various combinations of elevational and azimuthal orientations, any area of water around the boat can be scanned with the sonar instrumentation. The operator can change the orientation of the transducer without having to reach down into the water. Instead, the transducer can be remotely manipulated by the handle 25. Furthermore, the direction of handle movements correspond to the direction of transducer movements, thus simplifying operation.

The depth of the sonar transducer can be set by loosening the collar 91 on the tubular member 23 and then raising or lowering the tubular member. The collar 91 is loosened by loosening the set screw 109. When the tubular member is at its desired position relative to the ball 83, the set screw 109 is retightened to tighten the collar 91 onto the tubular member 23 just above the ball 83. If the transducer is positioned deeper than the boat hull so that the boat hull will not interfere with the sonar beam, then a sonar scan of 360 degrees can be obtained.

The tubular member 23 can be pivoted relative to the plates 85 and thus to the boat 15 by loosening the setting screw 101, 103 so that the ball 83 can rotate between the plates 85. This allows the tubular member 23 to be positioned in a vertical orientation regardless of the mounting configuration to the boat. A bull's eye level 131 can be affixed to the first end 33 of the tubular member to assist in the vertical alignment.

The mounting apparatus 11 can be easily removed from the boat 15 for towing or storage. The setting screw 101, 103 is loosened to unclamp the two plates 85 from the bracket bar 107. When sufficiently loose, the plates 85 are slid parallel to the bracket bar 107 to disengage the bar. Thus, the bracket 89 can remain bolted to the boat deck.

The foregoing disclosure and the showings made in the drawings are merely illustrative of the principles of the invention and are not to be interpreted in a limiting sense.

I claim:

1. An apparatus for mounting a sonar transducer to a boat, comprising:
    (a) a first member having first and second end portions;
    (b) handle means pivotally coupled to said first member first end portion;
    (c) transducer mounting means being adapted for coupling to said sonar transducer, said transducer mounting means being pivotally coupled to said first member second end portion such that said transducer mounting means can change elevational orientation with respect to a water line of said boat;
    (d) a second member located adjacent to said first member, said second member coupled to said handle means and to aid transducer mounting means so as to link said transducer mounting means to said handle means, wherein when said handle means is pivoted the elevational orientation of said transducer mounting means correspondingly changes;
    (e) first member mounting means for mounting said first member to said boat said first member mounting means having an opening for receiving said first member, said first member being able to slide in said opening relative to said first member mounting means, said first member mounting means allowing said first member, said handle means, and said transducer mounting means to turn wherein the azimuthal orientation of said transducer mounting means changes;

(f) retaining means for retaining said first member in a selected position relative to said first member mounting means.

2. The apparatus of claim 1 wherein said first member is tubular with an opening at said first member first end portion for receiving said handle means, said second member being disposed inside of said first member.

3. The apparatus of claim 2 wherein said second member is a rod.

4. The apparatus of claim 2 wherein said first member mounting means comprises:
(a) a ball having a cylindrical bore therethrough for receiving said first member;
(b) ball retaining means for retaining said ball.

5. The apparatus of claim 4 wherein said retaining means comprises stop means for stopping the first member from sliding through said first member mounting means opening beyond a selected position, said stop means being slidable along said first member, said stop means being located on said first member between said first member mounting means and said first end, said stop means being selectively fixed in position along the length of said first member, said stop means allowing the adjustment of the submerged depth of said first member second end.

6. The apparatus of claim 4 wherein said second member is a rod.

7. The apparatus of claim 6 further comprising said transducer mounting means being pivotable between first and second orientations, said first orientation having said sonar transducer directing its sonar beam in a direction that is generally parallel to the longitudinal axis of said first member, said longitudinal axis extending between said first member first and second ends, said second orientation having said sonar transducer directing its sonar beam in a direction that is generally perpendicular to the longitudinal axis of said first member.

8. The apparatus of claim 7 wherein said ball retaining means comprises two plates having openings for receiving a respective hemisphere of said ball, said plates exerting releasable compressive force on said ball so that said ball and said first member can be pivoted relative to said plates when said compressive force is released.

9. The apparatus of claim 8 wherein said plates clamp with said compressive force onto a mounting bracket that is adapted to be mounted to said boat, wherein said plates and said tubular member can be removed from said mounting bracket upon the release of said compressive force.

10. The apparatus of claim 1 further comprising said transducer mounting means being pivotable between first and second orientations, said first orientation having said sonar transducer directing its sonar beam in a direction that is generally parallel to the longitudinal axis of said first member, said longitudinal axis extending between said first member first and second ends, said second orientation having said sonar transducer directing its sonar beam in a direction that is generally perpendicular to the longitudinal axis of said first member.

11. An apparatus for mounting a sonar transducer to a boat, comprising:

(a) a tubular member having first and second ends and an interior cavity extending between said first and second ends, said tubular member having first and second openings located near said first and second ends, said first and second openigns allowing communication between the exterior of said tubular member and said interior cavity;
(b) handle means pivotally coupled to said tubular member first end portion through said first opening;
(c) transducer mounting means being adapted for coupling to said sonar transducer, said transducer mounting means being pivotally coupled to said tubular member second end portion such that said transducer mounting means can change elevational orientation with respect to a water line of said boat;
(d) a linkage rod located in said interior cavity and having first and second ends, said linkage rod first end being pivotally coupled to said handle means, said linkage rod second end being pivotally coupled to said transducer mounting means, said transducer mounting means being pivotable by pivoting said handle means;
(e) a ball having a cylindrical bore therethrough for matingly receiving said tubular member such that said tubular member can slide through said ball, said ball being located between said tubular member first and second ends;
(f) ball retaining means for retaining said ball and adapted for mounting said ball to said boat, said ball retaining means allowing pivoting movement of said ball and said tubular member;
(g) collar means located on said tubular member between said ball and said tubular member first end, said collar means maintaining the position of said tubular member first end relative to said ball.

12. The apparatus of claim 1 wherein said retaining means comprises a collar located on said first member between said first member mounting means and said first end and being capable of sliding on said first member, said collar having set screw means to releasably secure said collar in a selected position on said first member.

13. The apparatus of claim 2 wherein said retaining means comprises a collar located on said first member between said first member mounting means and said first end and being capable of sliding on said first member, said collar having set screw means to releasably secure said collar in a selected position on said first member.

14. The apparatus of claim 1 wherein said first member mounting means comprises:
(a) a ball having a bore therethrough for matingly receiving said first member;
(b) ball retaining means for retaining said ball, said ball retaining means comprising two plates having openings for receiving a respective hemispheric portion of said ball, said plates exerting releasable compressive force on said ball so that said ball and said first member can be pivoted relative to said plates when said compressive force is released.

15. The apparatus of claim 14 wherein said plates clamp with said compressive force onto a mounting bracket that is adapted to be mounted to said boat, wherein said plates and said tubular member can be removed from said mounting bracket upon the release of said compressive force.

16. The apparatus of claim 15 wherein said bore of said ball has a groove that receives an O-ring such that said O-ring extends circumferentially around said first member.

17. The apparatus of claim 16 wherein said retaining means comprises a collar located on said first member between said first member mounting means and said first end and being capable of sliding on said first member, said collar having set screw means to releasably secure said collar in a selected position on said first member.

18. The apparatus of claim 14 further comprising level means for providing an indication of when said first member is oriented vertically, said level means being affixed to said first member.

19. The apparatus of claim 14 wherein said retaining means comprises a collar located on said first member between said first member mounting means and said first end and being capable of sliding on said first member, said collar having set screw means to releasably secure said collar in a selected position on said first member.

20. The apparatus of claim 4 wherein said bore of said ball has a groove that receives an O-ring such that said O-ring extends circumferentially around said first member.

21. The apparatus of claim 1 wherein said bore of said ball has a groove that receives an O-ring such that said O-ring extends circumferentially around said first member.

22. An apparatus for mounting a sonar transducer to a boat, comprising:
  (a) a first member having first and second end portions;
  (b) handle means pivotally coupled to said first member first end portion;
  (c) transducer mounting means being adapted for coupling to said sonar transducer, said transducer mounting means being pivotally coupled to said first member second end portion such that said transducer mounting means can change elevational orientation with respect to a water line of said boat;
  (d) a second member located adjacent to said first member, said second member coupled to said handle means and to said transducer mounting means so as to link said transducer mounting means to said handle means, wherein when said handle means is pivoted the elevational orientation of said transducer mounting means corresponding changes;
  (e) first member mounting means for mounting said first member to said boat such that said first member second end portion is submerged when said boat is in the water and said first member first end portion is above the water, said first member mounting means allowing said first member, said handle means, and said transducer mounting means to turn wherein the azimuthal orientation of said transducer mounting means changes;
  (f) said first member being tubular with an opening at said first member first end portion for receiving said handle means, said second member being disposed inside of said first member;
  (g) said first member mounting means comprising a ball having a cylindrical bore therethrough for receiving said first member and ball retaining means for retaining said ball;
  (h) said first member being a rod;
  (i) said transducer mounting means being pivotable between first and second orientations, said first orientation having said sonar transducer directing its sonar beam in a direction that in generally parallel to the longitudinal axis of said first member; said longitudinal axis extending between said first member first and second ends, said second orientation having said sonar transducer directing its sonar beam in a direction that is generally perpendicular to the longitudinal axis of said member;
  (j) said ball retaining means comprising two plates having openings for receiving a respective hemisphere of said ball, said plates exerting releasable compressive force on said ball so that said ball and said first member can be pivoted relative to said plates when said compressive force is released.

23. The apparatus of claim 22 wherein said plates clamp with said compressive force onto a monthly bracket that is adapted to be mounted to said boat, wherein said plates and said tubular member can be removed from said mounting bracket upon the release of said compressive force.

* * * * *